G. F. CLEVINGER.
COMBINED SHAVING MUG.
APPLICATION FILED APR. 12, 1918.

1,280,402.

Patented Oct. 1, 1918.

Witness
T. H. Parnell

Inventor
G. F. Clevinger
By Victor J. Evans
Attorney

UNITED STATES PATENT OFFICE.

GUNTHER F. CLEVINGER, OF CHARLOTTE, NORTH CAROLINA.

COMBINED SHAVING-MUG.

1,280,402.  Specification of Letters Patent.  Patented Oct. 1, 1918.

Application filed April 12, 1918. Serial No. 228,202.

*To all whom it may concern:*

Be it known that I, GUNTHER F. CLEVINGER, a citizen of the United States, residing at Charlotte, in the county of Mecklenburg and State of North Carolina, have invented new and useful Improvements in Combined Shaving-Mugs, of which the following is a specification.

This invention relates to combination shaving mugs and it consists in the novel features hereinafter described and claimed.

An object of the invention is to provide a mug of the character stated which may be used for holding and retaining soap and also is used for inclosing a mirror and brush holder, there being provided a lid or cover for the body of the mug whereby the mug may be completely incased when the lid is applied.

A further object of the invention is to provide a combined article as stated which is of simple structure and the parts so arranged that they may be compactly assembled and packed in small space for transportation purposes.

With the above objects in view the mug comprises a body provided at its sides with an annular inwardly disposed shoulder and a flanged cover arranged to close over the body. A brush holder is adapted to be inclosed in the body below the cover and above the shoulder.

Figure 1:
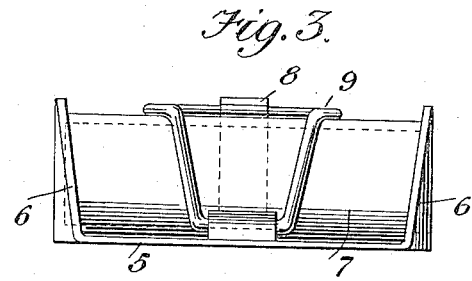
Figure 1 is a transverse sectional view of the combination shaving mug.

The combination mug comprises a body 1 which is provided above its bottom and below its upper edge with an annular inwardly disposed shoulder 2. The lower portion of the mug may retain a cake of soap. As shown in Fig. 1 a cover 3 is arranged to close over the top of the mug 1 and is provided with an annular flange 4 which fits snugly in the upper portion of the body of the mug.

Figure 2:
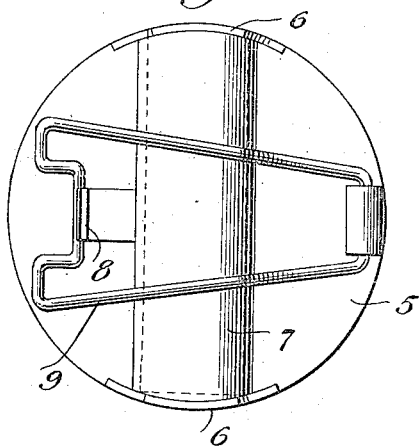
Fig. 2 is an under plan view of the brush holder as shown in Fig. 1.
Figure 3:
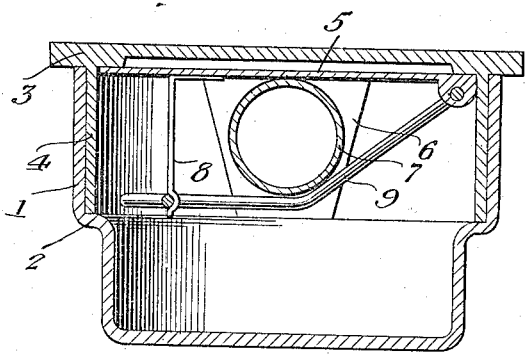
Fig. 3 is a side view of the brush holder.

In the form of the invention as illustrated in Figs. 1, 2, and 3 a combined brush holder and mirror is used and the said device includes a mirror proper 5 having a frame 6 attached to its back. The mirror 5 may be received within the flange 4 of the cover 3 and the frame 6 may rest at its ends upon the shoulder 2. The frame 6 is provided with a tube 7 which is closed at one end and open at its other end and which is adapted to receive and retain a shaving brush. A resilient clip 8 is provided at one side of the frame 6 and at a point between the ends thereof. A prop member 9 is pivotally connected with the mirror 5 and may extend transversely across the tube 7 and engage the clip 8 whereby the prop member is held at a fixed position with relation to the mirror and frame. When the mirror and frame are removed from the mug the prop member may be disengaged from the clip and the mirror may be placed upon its edge and the prop member extended whereby the mirror may be supported in an inclined position upon a level surface. Therefore the mirror may be used by a person who is using the shaving mug.

From the foregoing description taken in conjunction with the accompanying drawing it will be seen that a combination shaving mug of simple and durable structure is provided and that the same may be conveniently used for retaining a quantity of soap and also for retaining accessories as for instance a shaving brush and mirror.

Having described the invention what is claimed is:—

1. A mug comprising a body provided with an inwardly disposed shoulder, a cover for the body, a frame adapted to fit in the body and rest upon the shoulder and a brush holder carried by the frame and adapted to rest on the shoulder.

2. A mug comprising a body having an inwardly disposed shoulder, a cover for the body, a frame adapted to rest upon the shoulder and having means for supporting a brush, a mirror attached to the frame, a prop pivotally connected with the mirror and a clip carried by the frame and engageable with the prop to hold the same at a fixed position.

3. A mug comprising a body having an inwardly disposed shoulder, a frame insertible in the body and adapted to rest on the shoulder, a tube carried by the frame and closed at one end and open at its opposite end, a mirror attached to the frame, a prop pivoted to the mirror and a resilient clip carried by the frame and engageable with the prop.

In testimony whereof I affix my signature.

GUNTHER F. CLEVINGER.

Copies of this patent may be obtained for five cents each, by addressing the "Commissioner of Patents, Washington, D. C."